United States Patent
Rutelin et al.

(10) Patent No.: US 11,059,448 B2
(45) Date of Patent: Jul. 13, 2021

(54) CURTAIN AIRBAG ASSEMBLY

(71) Applicant: Volvo Car Corporation, Gothenburg (SE)

(72) Inventors: Sebastian Rutelin, Gothenburg (SE); Johan Rosenberg, Lerum (SE); Sven-Olof Persson, Mölnlycke (SE)

(73) Assignee: Volvo Car Corporation, Gothenburg (SE)

( * ) Notice: Subject to any disclaimer, the term of this patent is extended or adjusted under 35 U.S.C. 154(b) by 59 days.

(21) Appl. No.: 16/432,388

(22) Filed: Jun. 5, 2019

(65) Prior Publication Data

US 2020/0384939 A1    Dec. 10, 2020

(51) Int. Cl.
*B60R 21/232* (2011.01)
*B60R 21/214* (2011.01)
*B60R 21/2338* (2011.01)
*B60R 21/216* (2011.01)
*B60R 21/01* (2006.01)
*B60R 21/231* (2011.01)

(52) U.S. Cl.
CPC .......... *B60R 21/232* (2013.01); *B60R 21/214* (2013.01); *B60R 21/216* (2013.01); *B60R 21/2338* (2013.01); *B60R 2021/01013* (2013.01); *B60R 2021/23161* (2013.01)

(58) Field of Classification Search
CPC ........ B60R 21/214; B60R 2021/23153; B60R 21/06; B60R 21/08; B60R 2021/168; B60R 2021/23161
See application file for complete search history.

(56) References Cited

U.S. PATENT DOCUMENTS

| 7,008,154 B1* | 3/2006 | Nolle ...................... B60R 7/005 410/118 |
| 9,744,932 B1 | 8/2017 | Faruque et al. |
| 9,902,362 B2 | 2/2018 | Farooq et al. |
| 9,994,182 B1 | 6/2018 | Jaradi et al. |
| 10,023,145 B1 | 7/2018 | Rivera et al. |

(Continued)

FOREIGN PATENT DOCUMENTS

WO    20180132332 A1    7/2018
WO    20180167919 A1    9/2018

*Primary Examiner* — Paul N Dickson
*Assistant Examiner* — Mary E Young
(74) *Attorney, Agent, or Firm* — Clements Bernard Walker; Christopher L. Bernard

(57) ABSTRACT

A present implementation of an airbag system is adapted to include a curtain airbag assembly having a vertical barrier extended in a vertical direction when deployed, the vertical barrier having a first inflatable part deployed at a left side of a vehicle and a second inflatable deployed at a right side of the vehicle. The airbag system further includes sensors adapted to sense parameters associated with operational characteristics of a vehicle and an electronic control unit (ECU) adapted to receive the parameters from the sensors. The ECU is further adapted to monitor the plurality of parameters to determine if the vehicle is experiencing an accident. The airbag system further includes an inflation module adapted to deploy the curtain airbag assembly. If the ECU determines that an accident is occurring, the ECU provides a trigger signal to the inflation module to initiate a process to deploy the curtain airbag assembly.

23 Claims, 12 Drawing Sheets

(56) References Cited

U.S. PATENT DOCUMENTS

| | | | |
|---|---|---|---|
| 2004/0066022 A1* | 4/2004 | Mori | B60R 21/214 |
| | | | 280/730.1 |
| 2006/0214401 A1* | 9/2006 | Hirata | B60R 21/232 |
| | | | 280/730.1 |
| 2012/0292894 A1* | 11/2012 | Kobayashi | B60R 21/20 |
| | | | 280/730.1 |
| 2017/0225641 A1* | 8/2017 | Faruque | B60R 21/2338 |
| 2018/0361981 A1* | 12/2018 | Faruque | B60R 21/231 |
| 2019/0047479 A1* | 2/2019 | Faruque | B60R 7/08 |
| 2019/0202391 A1* | 7/2019 | Cho | B60R 21/233 |
| 2019/0217804 A1* | 7/2019 | Cho | B60R 21/214 |
| 2019/0241148 A1* | 8/2019 | Shin | B60R 21/2338 |
| 2020/0062210 A1* | 2/2020 | Fukawatase | B60R 21/231 |

* cited by examiner

CURTAIN AIRBAG ASSEMBLY

TECHNICAL FIELD

The present disclosure is generally directed to the automotive field. More particularly, the present disclosure relates to airbag systems used in a vehicle for protecting passengers during an accident.

BACKGROUND

Vehicles are built with various types of safety systems that are used to protect occupants of the vehicle during an accident. Airbag systems have become a standard feature in vehicles and may be useful for many different types of accident scenarios. For example, the typical driver airbag, which is normally deployed through the center of the steering wheel, is inflated to protect the driver during a front-end collision. Some other types of airbags that may be equipped in vehicles can include side airbags, side torso airbags, and curtain airbags for protecting passengers in side-impact or roll-over scenarios. Also, knee airbags are designed to provide protection to the knees and lower legs of passengers during an accident. Some vehicles may further be equipped with other types of airbags, such as rear curtain airbags for protecting occupants during a rear-impact collision, seat belt airbags for cushioning the chest of the occupant from the force of the seat belt during an accident, among others.

Although the above-mentioned airbags have been proven to save numerous lives each year, additional safety measures can be made to help further reduce injuries. For instance, statistics show that numerous people are injured every year from being struck by unrestrained or loose objects during accidents. During an accident, the vehicle and passengers can come to a stop in a very short amount of time, but unrestrained objects (e.g., cell phones, laptops, water bottles, soda cans, groceries, etc.) continue moving at the speed and direction that the vehicle was travelling immediately before impact. Thus, these unrestrained objects can essentially become projectiles within the passenger cabin, potentially causing injury to the vehicle's occupants in the event of an accident.

Additionally, self-driving or autonomous vehicles (AVs), which include automated controls for handling the task of driving, are becoming more prevalent. With AVs, it may not be necessary for a vehicle occupant to keep his or her mind on the operation of the vehicle, and thus, the vehicle occupant may not necessarily need to sit in a conventional forward-facing position behind a steering wheel. These types of vehicles may thereby include a different seating arrangement, such as a carriage-style seating arrangement in which passengers in a front row of seats may face rearward and may be face-to-face with passengers in a back row of seats. One problem with such an arrangement, however, is that the rearward facing passengers may unexpectedly be targets of any number of unrestrained objects flung through the air during an accident.

Therefore, there is a need to provide additional safety equipment within a vehicle to protect the lives and security of passengers during accidents. More particularly, there is a need to protect passengers from unrestrained objects that may become unintended projectiles during an accident.

SUMMARY

Accordingly, the present disclosure provides, among other things, various airbag systems adapted for use in a vehicle. One embodiment of an airbag system includes a curtain airbag assembly including at least a vertical barrier adapted to extend in a vertical direction when the curtain airbag assembly is deployed. The vertical barrier may comprise at least a first inflatable part adapted to extend near a left side of an interior of the vehicle when the curtain airbag assembly is deployed and a second inflatable part adapted to extend near a right side of the interior of the vehicle when the curtain airbag assembly is deployed. The airbag system may further include a plurality of sensors adapted to sense a plurality of parameters associated with operational characteristics of a vehicle. An electronic control unit (ECU) may be adapted to receive the plurality of parameters from the plurality of sensors and monitor the plurality of parameters to determine if the vehicle is experiencing an accident. The airbag system may also include an inflation module adapted to deploy the curtain airbag assembly. If the ECU determines that the vehicle is experiencing an accident of sufficient severity, the ECU is adapted to provide a trigger signal to the inflation module to initiate a process to deploy the curtain airbag assembly.

According to another embodiment, a curtain airbag assembly deployable from a headliner section of a vehicle is described in the present disclosure. The curtain airbag assembly may include a vertical barrier adapted to extend downward in a substantially vertical direction from the headliner section of the vehicle when the curtain airbag assembly is deployed. The curtain airbag assembly may further include a front angled support system and a back angled support apparatus. The front angled support system may have a top end connected to a front portion of the headliner section and a bottom end connected to a bottom portion of the vertical barrier. The back angled support apparatus may have a top end connected to a back portion of the headliner section and a bottom end connected to the bottom portion of the vertical barrier. At least one of the front angled support system and back angled support apparatus includes a sheet and/or a plurality of inflatable members

BRIEF DESCRIPTION OF THE DRAWINGS

The present disclosure is directed to various embodiments illustrated and described herein with reference to the various drawings, in which like reference numbers are used to denote like system or assembly components/methods or algorithm steps. The illustrated components of the various systems are not necessarily drawn to scale.

DETAILED DESCRIPTION

The present disclosure describes various embodiments of airbags and airbag systems that can be deployed to protect passengers of a vehicle during an accident. More particularly, the embodiments of airbags and airbag systems described herein may be adapted to protect passengers, particularly rear-facing passengers, who can potentially be struck by unrestrained objects that might be thrown through the air when the vehicle experiences a collision, particularly a front-end collision.

For example, the airbags described in the present application may primarily include roof-mounted airbags that can be deployed downward during an accident in a substantially vertical direction. Some of the airbag assemblies may be mounted at a position in the headliner portion of a vehicle in between a front position where a front row of seats may be located and a back position where a back row of seats may be located, particularly when the front and back rows of seats are arranged in a face-to-face orientation with the front row passengers facing rearward and the back row passengers facing forward.

For instance, in the event of an accident, loose objects (e.g., cell phones, laptops, etc.) that may be held by or lying next to the front-facing passengers may become projectiles that can strike the rear-facing passengers in the front row of seats, causing injury. Thus, the embodiments described herein are intended to provide protection to passengers from potential injury caused by unrestrained objects flung throughout the passenger cabin during an accident.

Figure 1:
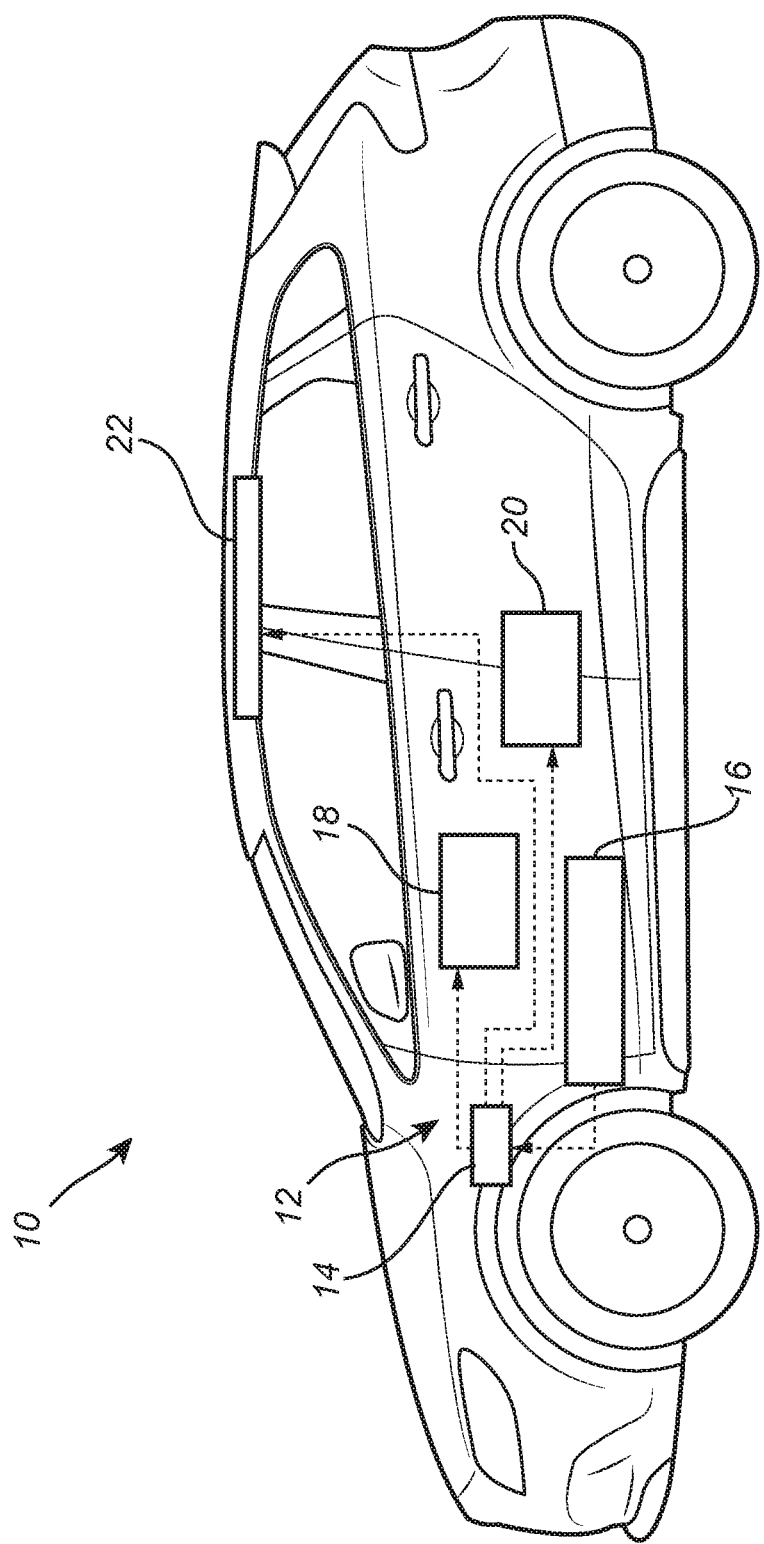
FIG. 1 is a diagram illustrating a side view of a vehicle including an airbag system according to some embodiments of the present disclosure.

FIG. 1 is a diagram showing a side view of a vehicle 10 having an airbag system 12 according to various embodiments. For example, the airbag system 12 may include, among other things, an electronic control unit (ECU) 14, one or more sensors 16, and one or more airbag devices 18, 20, 22. Although three airbag devices 18, 20, 22 are illustrated in FIG. 1, it should be understood that the vehicle 10 may include any number of airbags and/or airbag assemblies. According to the various implementations discussed in the present disclosure, the vehicle 10 may include at least one curtain airbag assembly that is adapted to protect passengers from unrestrained or loose objects that may fly through the air when an accident is occurring.

The ECU 14 may be an airbag control unit and may include any suitable type of processing elements adapted to control the deployment of one or more of the airbag devices 18, 20, 22 in the event of an accident. The ECU 14 is configured to monitor certain load case criteria (e.g., severity of a collision, occupants present, crash direction, etc.) to determine if the conditions satisfy certain limits or parameters necessary to deploy one or more of the airbag devices 18, 20, 22.

The sensors 16 may be positioned anywhere on the vehicle 10 for detecting the operational conditions of the vehicle 10. For example, the sensors 16 may sense the velocity, acceleration, and deceleration of the vehicle 10, the location and weight of passengers within the vehicle 10, external forces being exerted on the vehicle 10, and other factors or characteristics. The sensors 16 may include any one or more of micro-electromechanical system (MEMS) accelerometers or other types of accelerometers or gyroscopes and/or may also include any one or more of pressure sensors, impact sensors, speed sensors, brake pressure sensors, weight sensors, seat occupancy sensors, and/or other suitable types of sensors.

The ECU 14 is adapted to receive signals from the sensors 16 and continuously determine if the operational conditions are indicative of the vehicle 10 experiencing an accident. If the ECU 14 determines that an accident is occurring, the ECU 14 sends trigger signals to one or more airbag devices 18, 20, 22 positioned at various places within the vehicle 10 for protecting the passengers of the vehicle 10 during the accident.

In some embodiments, the ECU 14 may control the deployment of airbags of each of the airbag devices 18, 20, 22 based on the characteristics of the accident and the positioning of passengers. For example, in the event of a frontal collision, a driver airbag (e.g., airbag device 18)

along with other airbags may be deployed as needed. According to some embodiments, the airbag device 22 may be configured as a curtain airbag device that may be stowed in a roof portion of the vehicle 10 and deployed in a downward direction during an accident. Thus, the curtain airbag device 22 described in the present disclosure may be adapted to protect passengers from unrestrained objects in the event of a collision.

Figure 2:
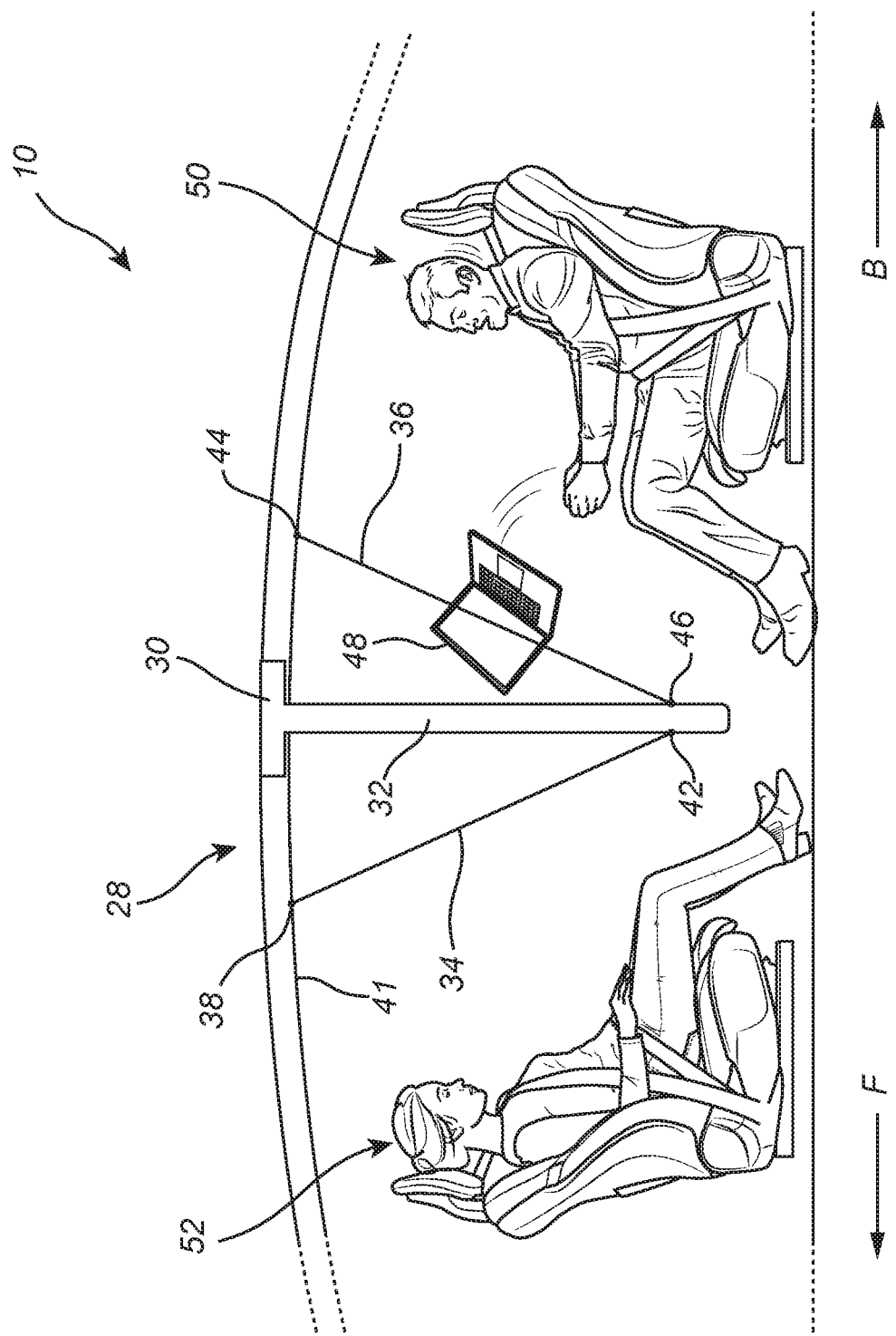
FIG. 2 is a diagram illustrating a side view of an interior of a vehicle having a first curtain airbag assembly according to some embodiments of the present disclosure.

FIG. 2 is a diagram showing a side view of an interior of the vehicle 10 having a curtain airbag assembly 28 as described with respect to the various aspects of the present disclosure. For reference purposes, the left side of FIG. 2 represents a front (F) end of the vehicle 10 and the right side of FIG. 2 represents a back (B) end of the vehicle 10.

Regarding the curtain airbag assembly 28, an inflator 30 may be adapted to receive a trigger signal from the ECU 14 when an accident is detected and inflate a vertical barrier 32 of the curtain airbag assembly 28. The inflator 30 (as well as other inflators and inflation mechanisms described throughout the present disclosure) may be configured as a pyrotechnic device having an ignitor that ignites a propellant to generate gas that inflates one or more bags of the vertical barrier 32. Various embodiments of the vertical barrier 32 are described below with respect to FIGS. 9-15.

According to alternative embodiments, the vertical barrier 32 may be configured without an inflatable bag, whereby the curtain airbag assembly 28 may consequently be adapted such that a front angled support system 34 or a back angled support system 36 includes one or more inflatable bags to be inflated by other inflators during an accident, whereby the vertical barrier 32 acts to shield passengers from unstrained objects. Various embodiments of the front angled support system 34 and back angled support system 36 are described below with respect to FIGS. 16-21.

In the illustrated embodiment of FIG. 2, the release of the gas by the inflator 30 inflates the vertical barrier 32, which, when deployed, is formed as a central curtain or blanket for protecting passengers from flying objects. The curtain airbag assembly 28 further includes the front angled support system 34 and the back angled support system 36, which together control the positioning of the vertical barrier 32 when deployed.

A top end of the front angled support system 34 may be connected to one or more front roof supports 38 secured to a roof portion 40 or headliner 41 (or other frame elements) of the vehicle 10. The front roof supports 38 may be connected to the roof 40 or headliner 41 at a forward position along the roof 40 or headliner 41 with respect to the inflator 30. A bottom end of the front angled support system 34 may be connected to one or more points 42 at or near a bottom end of the vertical barrier 32 when inflated. Similarly, a top end of the back angled support system 36 may be connected to one or more rear roof supports 44 secured to the roof portion 40, headliner 41, or frame of the vehicle 10. The rear roof supports 44 may be connected to the roof 40 or headliner 41 at a rearward position along the roof 40 or headliner 41 with respect to the inflator 30. A bottom end of the back angled support system 36 may be connected to one or more points 46 at or near the bottom end of the vertical barrier 32 when inflated.

The front and back angled support systems 34, 36 are adapted to control the process of deployment of the vertical barrier 32 Without the supports 34, 36, the vertical barrier 32 may extend from the inflator 30 in an unpredictable direction when being inflated. However, the front angled support system 34 prevents the vertical barrier 32 from extending too far rearward during inflation potentially causing it to directly contact the forward facing passengers 50. Also, the back angled support system 36 prevents the vertical barrier 32 from extending too far forward during inflation potentially causing it to directly contact the rearward facing passengers 52. Once inflated, the support systems 34, 36 may also be adapted to momentarily hold the vertical barrier 32 in place when it is contacted by an unrestrained object 48 or other loose objects.

Also, when the vertical barrier 32 is extended out fully, the front and back support systems 34, 36 may cause the vertical barrier 32 to be positioned in a substantially vertical orientation. Furthermore, the back support 36 may provide support to the vertical barrier 32 when the vertical barrier 32 experiences the forces exerted by the unrestrained object 48 when it contacts the vertical barrier 32. For example, when deployed, the vertical barrier 32 may be adapted to slow down or stop the movement of the unrestrained objects (e.g., object 48) that may be hurled through the air as a result of the sudden stopping of the vehicle 10 during a front-end collision.

The curtain airbag assembly 28 is adapted to be stowed in the headliner section 41 of the vehicle 10. When deployed, the curtain airbag assembly 28 causes the vertical barrier 32 to be directed downward in a substantially vertical arrangement from the headliner section 41. The end of the inflatable member (e.g., vertical barrier 32) may be attached to the supports 34, 36, which may be stretched during inflation to achieve a longitudinal stiffness of the structure.

Figure 3:
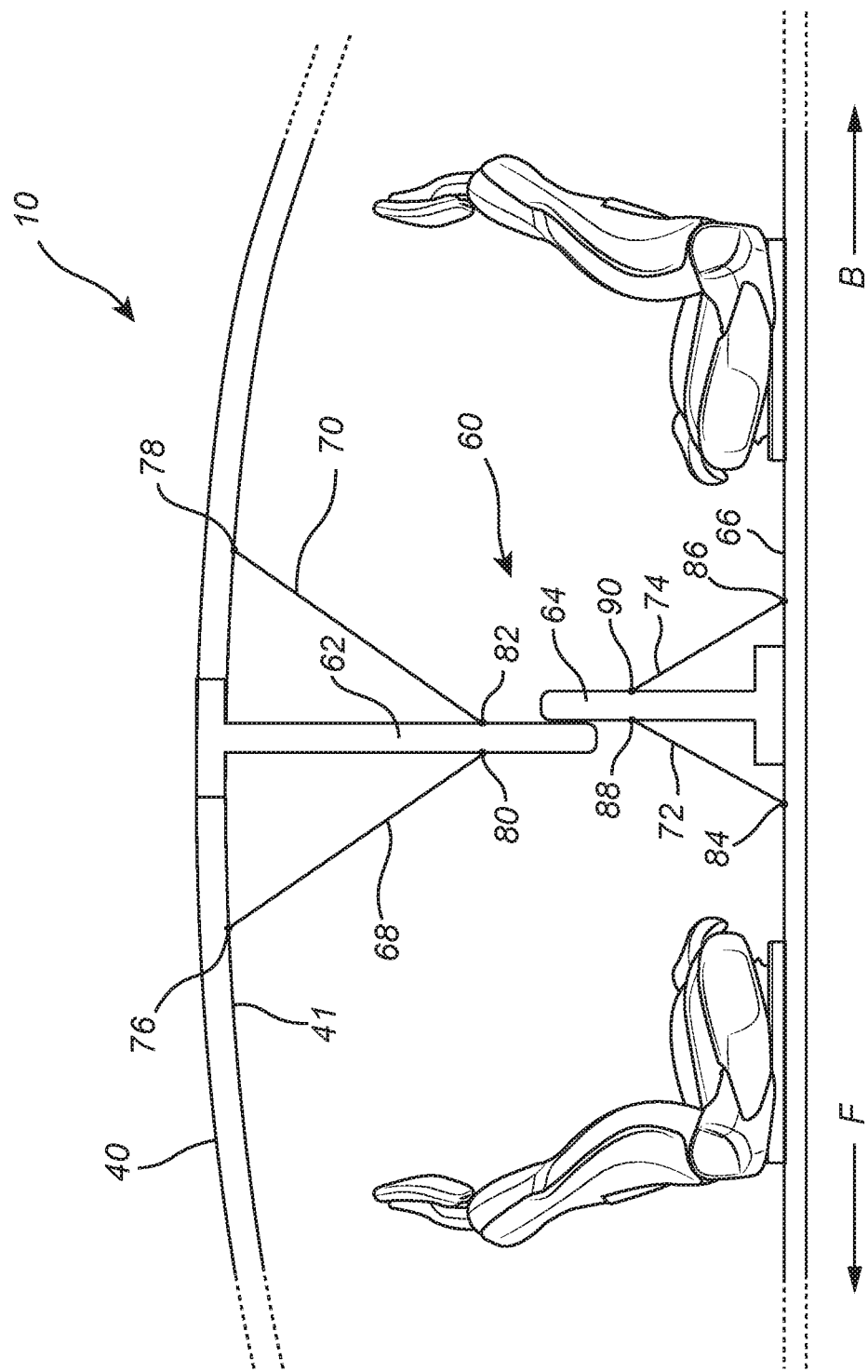
FIG. 3 is a diagram illustrating a side view of an interior of a vehicle having a second curtain airbag assembly according to other embodiments.

FIG. 3 shows a side view of the interior of the vehicle 10 including another embodiment of a curtain airbag assembly 60. In this embodiment, the curtain airbag assembly 60 includes a first vertical barrier 62 and a second vertical barrier 64. In this embodiment, the first vertical barrier 62 may extend downward from the roof 40 or headliner 41 of the vehicle 10 and the second vertical barrier 64 may extend upward from a floor 66 of the vehicle 10 during an accident. The supplemental vertical barrier (i.e., the second vertical barrier 64) may be adapted to protect the rear facing passengers 52 from unrestrained objects that may be located on the floor 66 of the vehicle 10 immediately before an accident.

In the embodiment of FIG. 3, the first vertical barrier 62 may be inflated in a substantially vertical arrangement with the assistance of a front angled support system 68 and a back angled support system 70. The second vertical barrier 64 may also be inflated in a substantially vertical arrangement with the assistance of a front angled support system 72 and a back angled support system 74. The front and rear support systems 68, 70 of the top vertical barrier 62 may include top ends that are connected to headliner supports 76, 78, respectively, and may include bottom ends that are connected to points 80, 82, respectively, on or near a bottom end portion of the top vertical barrier 62. Similarly, front and rear support systems 72, 74 of the bottom vertical barrier 64 may include bottom ends that are connected to floor supports 84, 86, respectively, and may include top ends that are connected to points 88, 90, respectively, on or near a top end portion of the bottom vertical barrier 64.

Figure 4:
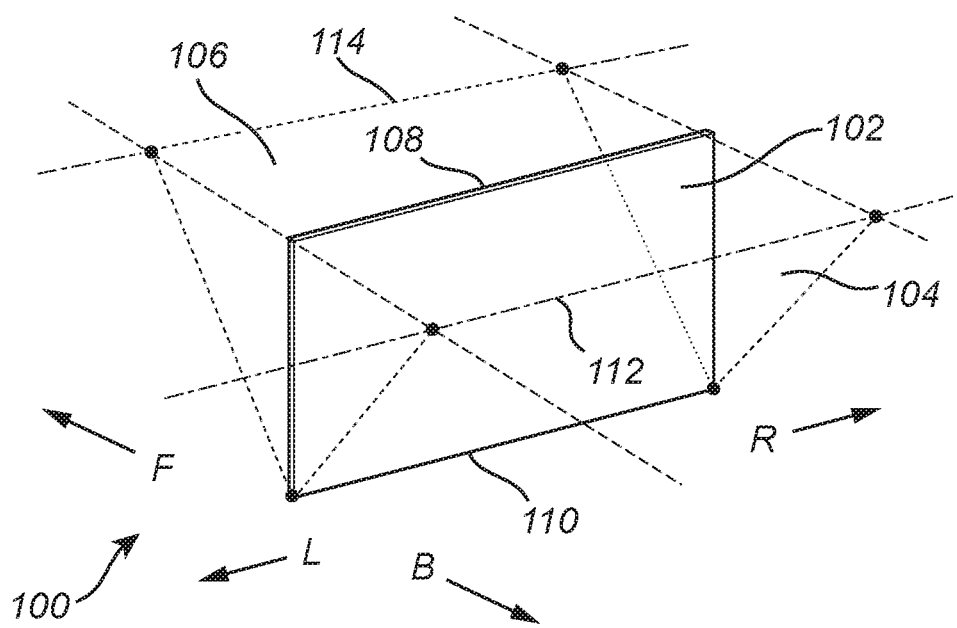
FIG. 4 is a diagram illustrating an isometric view of a first generalized representation of a curtain airbag assembly, according to various embodiments of the present disclosure.

FIG. 4 shows a generalized representation of various embodiments of curtain airbag assemblies 100 described throughout the present disclosure. The curtain airbag assemblies 100 may include a vertical barrier 102, a back angled support system 104, and a front angled support system 106. As mentioned above, the vertical barrier 102 may be implemented according to any number of various embodiments, such as those described with respect to FIGS. 9-15. Also, the back angled support system 104 and front angled support system 106 may also be implemented according to any number of various embodiments, such as those described with respect to FIGS. 16-21. In some embodiments, the back angled support system 104 and front angled support system 106 may be implemented in a similar manner and include the same, albeit mirrored, elements.

The curtain airbag assembly 100 shown in FIG. 4 represents an embodiment in which the vertical barrier 102 extends downward from a roof or headliner of a vehicle and may be connected to the roof or headliner at any points along a line or area 108 extending, at least partially, from one side (e.g., left) of the vehicle to the other (e.g., right). Also, one or more inflation mechanisms (not shown) may be arranged in the area 108 for inflating bags associated with the vertical barrier 102.

The back angled support system 104 may include any structure that is generally positioned in a plane defined by a bottom edge or bottom portion 110 of the vertical barrier 102 and points along a line or area 112 where one or more top portions of the back angled support system 104 are connected to the roof or headliner of the vehicle. The line or area 112 may also extend, at least partially, from one side of the vehicle to the other. Likewise, the front angled support system 106 may include any structure that is generally positioned in a plane defined by the bottom portion 110 of the vertical barrier 102 and points along a line or area 114 where one or more top portions of the front angled support system 106 are connected to the roof or headliner of the vehicle. The line or area 114 may also extend, at least partially, from one side of the vehicle to the other. Although the back angled support system 104 and front angled support system 106 are shown where they are both connected to the same bottom portion 110 of the vertical barrier 102, it should be understood that, in some embodiments, the bottom portions of the back and front support systems 104, 106 may be connected to different points or locations at or near the bottom end of the vertical barrier 102 (as shown in FIGS. 2 and 3).

Figure 5:
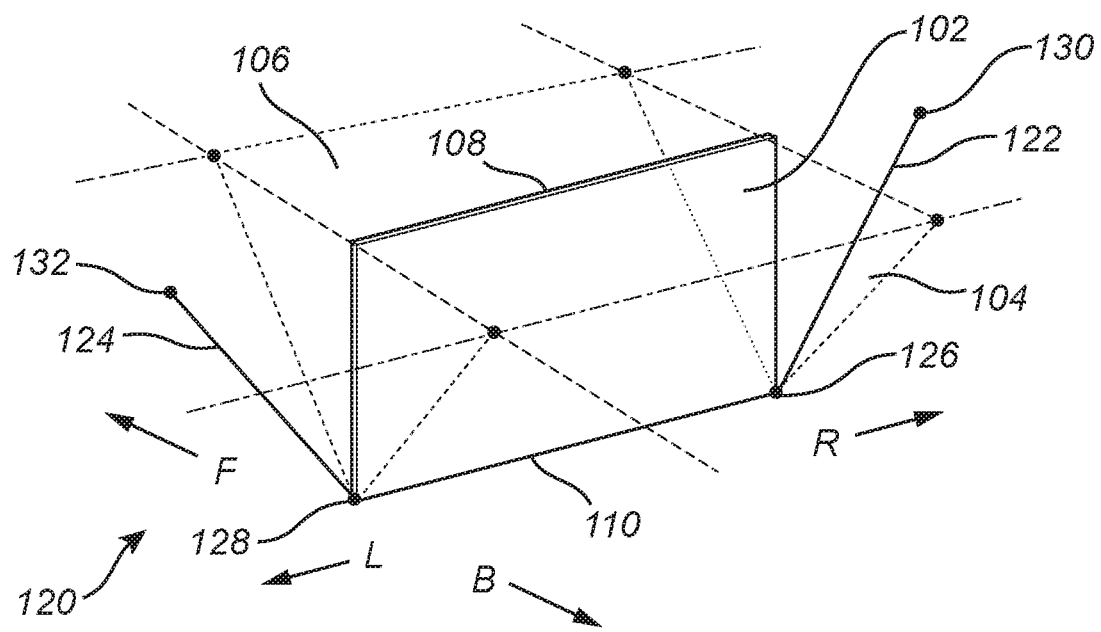
FIG. 5 is a diagram illustrating an isometric view of a second generalized representation of a curtain airbag assembly, according to various embodiments.

FIG. 5 shows another generalized representation of various embodiments of curtain airbag assemblies 120 described throughout the present disclosure. The curtain airbag assemblies 120 shown in FIG. 5 is similar to the embodiment shown in FIG. 4. In this embodiment, however, the curtain airbag assembly 120 includes elements in addition to the vertical barrier 102, back angled support system 104, and front angled support system 106, as mentioned above with respect to FIG. 4. The curtain airbag assembly 120 of FIG. 5 may further include a right angled support device 122 and a left angled support device 124. The right angled support device 122 may be adapted to keep a right lower corner 126 of the vertical barrier 102 from extending too far toward the left side of the vehicle. Also, the left angled support device 124 may be adapted to keep a left lower corner 128 of the vertical barrier 102 from extending too far toward the right side of the vehicle. Otherwise, the vertical barrier 102 may have a tendency to bunch together toward a center of the bottom portion 110 creating gaps where lower corners of the vertical barrier 102 should be.

The right angled support device 122 may include a lower end that is connected at or near the right lower corner 126 of the vertical barrier 102 and an upper end that is connected to one or more support points 130 on the roof or headliner to the right of the area 108 where the vertical barrier 102 is connected. Also, the left angled support device 124 may include a lower end that is connected at or near the left lower corner 128 of the vertical barrier 102 and an upper end that is connected to one or more support points 132 on the roof or headliner to the left of the area 108 where the vertical barrier 102 is connected. In some embodiments, the right angled support device 122 and left angled support device 124 may be configured as tethers or straps.

Figure 6:
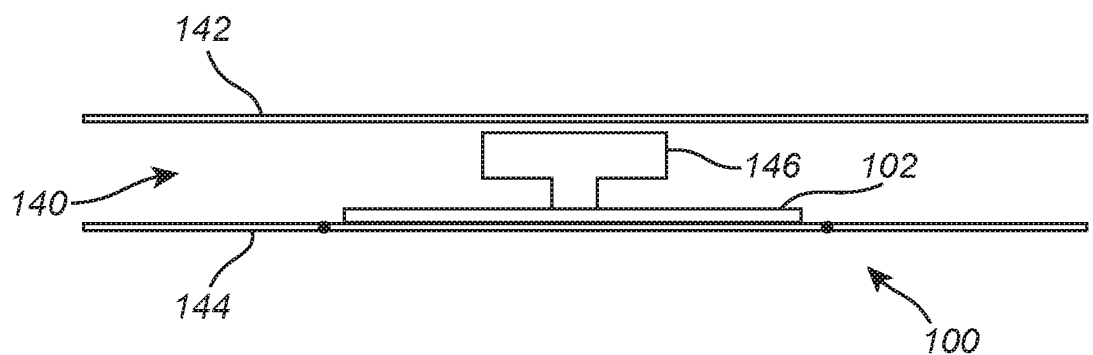
FIG. 6 is a diagram illustrating a cross-sectional side view of a stowed curtain airbag assembly, according to some embodiments.
Figure 7:
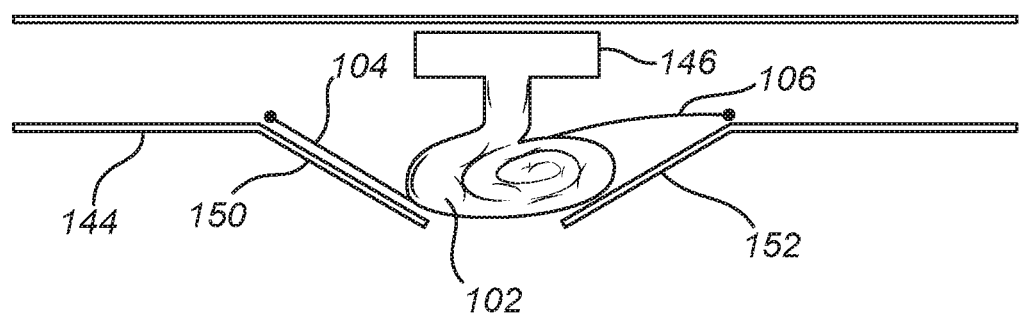
FIG. 7 is a diagram illustrating a cross-sectional side view of the curtain airbag assembly of FIG. 6 in the process of being deployed, according to some embodiments.
Figure 8:
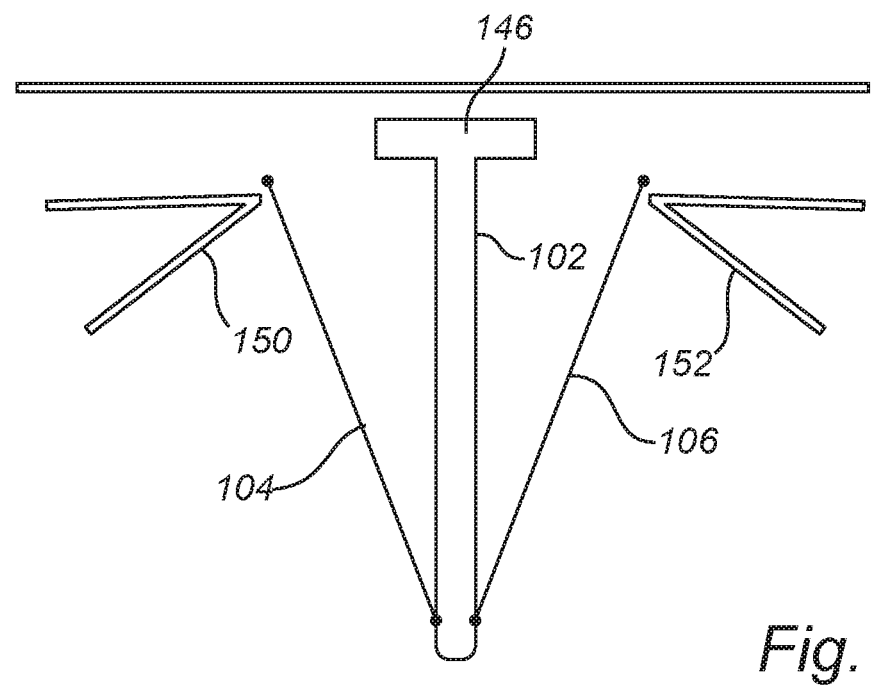
FIG. 8 is a diagram illustrating a cross-sectional side view of the curtain airbag assembly of FIG. 6 having been fully deployed, according to some embodiments.

FIGS. 6-8 are diagrams depicting the process of deployment of the curtain airbag assembly (e.g., curtain airbag assemblies 28, 60, 100, and/or 120). To simplify the explanation of the deployment, the curtain airbag assembly 100 of FIG. 4 will be used as a reference, although it should be understood that the deployment of other curtain airbag assemblies described in the present disclosure may also be applicable as well.

FIG. 6 shows a cross-sectional side view of the curtain airbag assembly 100 in a stowed position within an area 140 between a roof 142 and a headliner 144 of a vehicle. The curtain airbag assembly 100 is shown in a ready state before the vehicle experiences an accident. In this embodiment, the curtain airbag assembly 100 includes one or more inflation mechanisms 146 for inflating the one or more inflatable bags or vertical barrier 102 of the curtain airbag assembly 100 when an accident is detected. According to some embodiments, the inflatable bags of the vertical barrier 102 may be rolled up in a rolled state when in the ready state shown in FIG. 6. Alternatively, the inflatable bags may be arranged in a folded arrangement during storage.

FIG. 7 shows a cross-sectional side view of the curtain airbag assembly 100 in the process of being deployed. While the inflatable bag or bags of the vertical barrier 102 are being inflated by the inflation mechanisms 146, the bags are forced downward through breakaway doors 150, 152 of the headliner 144, whereby the breakaway doors 150, 152 represent a path of least resistance for the forceful and quick inflation of the bags. Also, the back angled support system 104 and front angled support system 106 may also be wrapped with the vertical barrier 102 and may begin to unroll during deployment.

FIG. 8 shows a cross-sectional side view of the curtain airbag assembly 100 after it has been fully deployed. In the fully deployed state, the vertical barrier 102 is extended downward is a substantially vertical direction and the back and front support systems 104, 106 may be adapted to keep the vertical barrier 102 in a proper position for its purpose of blocking unrestrained objects that might fly through the passenger cabin during an accident.

Figure 9:
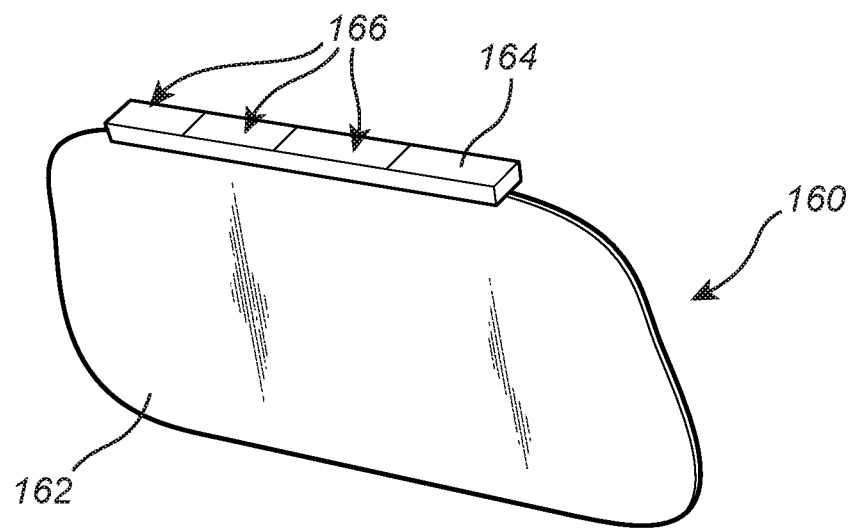
FIG. 9 is a diagram illustrating a perspective view of a first implementation of a vertical barrier of one of the curtain airbag assemblies shown in FIGS. 2-8, according to some embodiments.

FIG. 9 shows a perspective view of a first embodiment of a vertical barrier 160 of one of the curtain airbag assemblies shown in FIGS. 2-8. In this embodiment, the vertical barrier 160 includes a single inflatable bag 162, which, when inflated, may resemble a pillow oriented in a vertical direction. The bag 162 may be referred to as a panel airbag or blanket airbag.

The inflatable bag 162 may be securely connected to a frame 164, which may be connected to the roof or headliner of the vehicle. Also, the frame 164 may include one or more openings 166 that may be opened to an inflation mechanism that is adapted to inflate the bag 162 during an accident. In some embodiments, the vertical barrier 160 may include a single opening 166 pneumatically connected with a single inflation mechanism.

Figure 10:
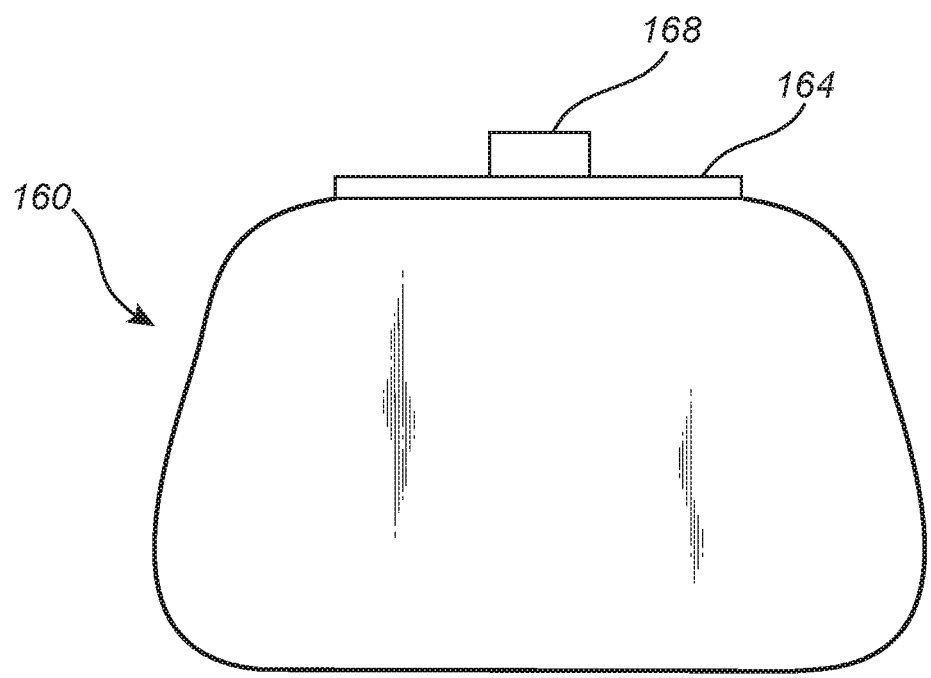
FIG. 10 is a diagram illustrating a rear view of the vertical barrier of FIG. 9, according to some embodiments.

FIG. 10 is a diagram illustrating a rear view of the vertical barrier 160 of FIG. 9. In this embodiment, the frame 164 is connected to an inflator 168 adapted to inflate the bag 162 of the vertical barrier 160. According to other embodiments, the bag 162 may be inflated by more than one inflator.

Figure 11:
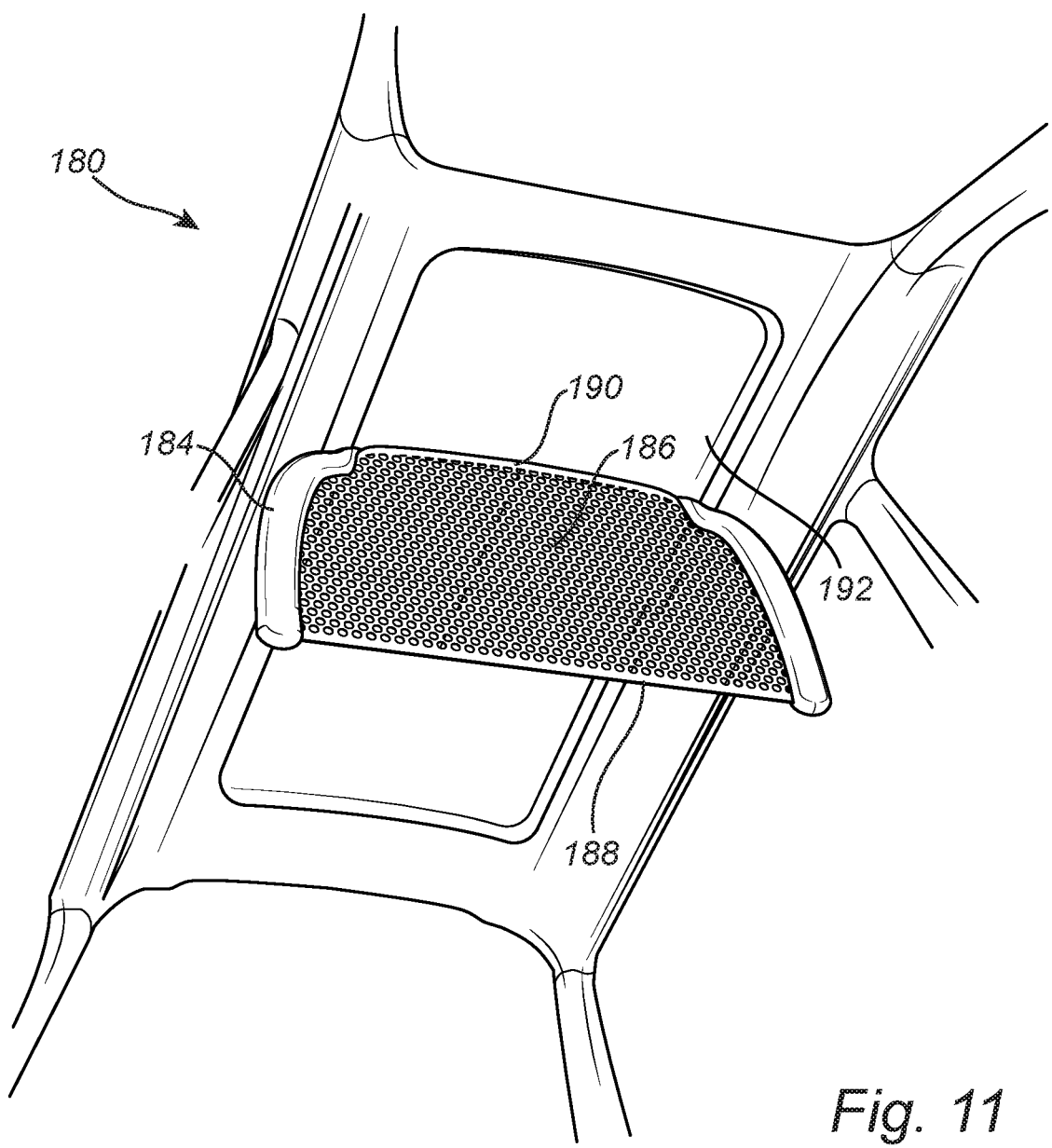
FIG. 11 is a diagram illustrating a perspective view of a second implementation of a vertical barrier of one of the curtain airbag assemblies shown in FIGS. 2-8, according to some embodiments.

FIG. 11 shows a perspective view of a second embodiment of a vertical barrier 180 of one of the curtain airbag assemblies shown in FIGS. 2-8. In this embodiment, the vertical barrier 180 may include a first inflatable bag 182 and a second inflatable bag 184. The inflatable bags 182, 184, when inflated, may resemble sausages or may be referred to as column airbags.

The vertical barrier 180 further includes a screen 186, which may be configured as a sheet, mesh, panel, or other structure and may include any suitable material. In some embodiments, the screen 186 may include non-inflatable components, such as mesh elements of fabric material sewn or woven to include holes therein. The screen 186 is connected on one side to the first inflatable bag 182 and is connected on the other side to the second inflatable bag 184. The screen 186 may include a lower strap 188 connected between a lower end of the first inflatable bag 182 and a lower end of the second inflatable bag 184. The screen 186 may also include a top end 190, which may be a strap or a connection element that is connected to the roof or headliner 192 of the vehicle and/or may be connected between a top end of the first inflatable bag 182 and a top end of the second inflatable bag 184.

The vertical barrier 180 may be deployed quickly during an accident by inflating the first and second inflatable bags 182, 184, which, because of their small size, do not require a large amount of gas to inflate. The first inflatable bag 182 may be deployed near or next to a first side of the vehicle (e.g., against a door and/or window) and the second inflatable bag 184 may be deployed near or next to a second side of the vehicle (e.g., against an opposite door and/or window). When deployed, the screen 186 is extended in a substantially vertical direction within the passenger cabin. In some embodiments, the screen 186 may be adapted to shield a first area having a first row of seats from a second area having a second row of seats. Accordingly, during an accident, the screen 186 can block unrestrained or loose objects from striking passengers in the row of seats in the opposite area.

Therefore, according to one embodiment of the present disclosure, the airbag system 12 described in FIG. 1 may be adapted for use in the vehicle 10 and may comprise a curtain airbag assembly (e.g., curtain airbag assembly 28, 60, 100, 120) including at least a vertical barrier (e.g., vertical barrier 180) adapted to extend in a vertical direction when the curtain airbag assembly is deployed. The vertical barrier 180 may have a first inflatable part (e.g., first inflatable bag 182) adapted to extend near a left side of an interior of the vehicle when the curtain airbag assembly is deployed and a second inflatable part (e.g., second inflatable bag 184) adapted to extend near a right side of the interior of the vehicle when the curtain airbag assembly is deployed. The airbag system 12 may further comprise a plurality of sensors (e.g., sensors 16 shown in FIG. 1) adapted to sense a plurality of parameters associated with operational characteristics of the vehicle 10 and an electronic control unit (ECU), such as ECU 14, adapted to receive the plurality of parameters from the plurality of sensors 16. The ECU 14 may be further adapted to monitor the plurality of parameters to determine if the vehicle 10 is experiencing an accident. The airbag system 12 may further comprise an inflation module (e.g., inflator 30, 146) adapted to deploy the curtain airbag assembly. If the ECU 14 determines that the vehicle 10 is experiencing an accident, the ECU 14 is further adapted to provide a trigger signal to the inflation module to initiate a process to deploy the curtain airbag assembly (e.g., the vertical barrier 180 of which is shown in FIG. 11).

Figure 12:
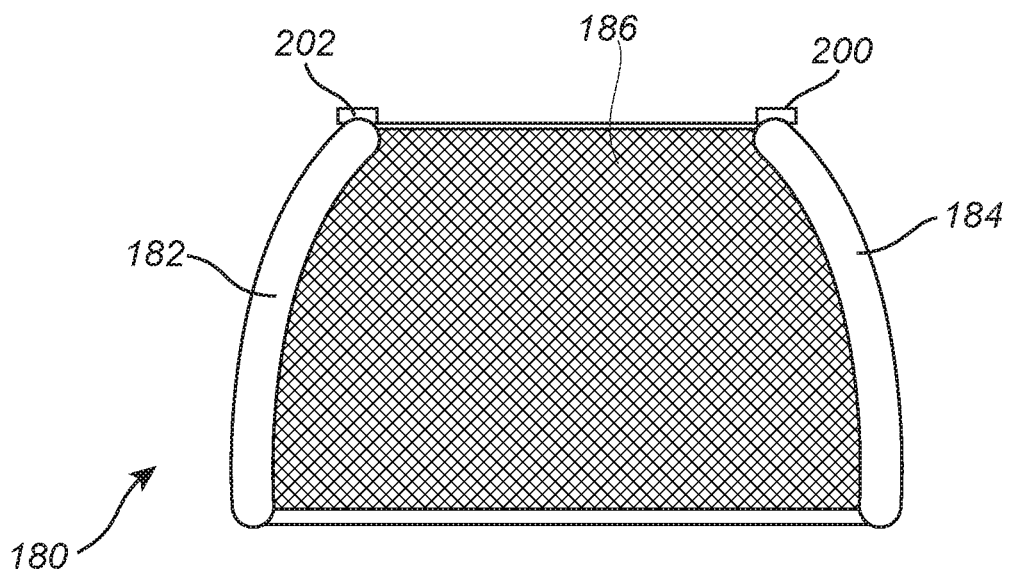
FIG. 12 is a diagram illustrating a rear view of the vertical barrier of FIG. 11, according to some embodiments.

FIG. 12 is a diagram illustrating a rear view of the vertical barrier 180 of FIG. 11. In this embodiment, the first inflatable bag 182 can be inflated by a first inflator 200 and the second inflatable bag 184 can be inflated by a second inflator 202. The inflators 200, 202, which combined form the inflator module mentioned above, may be connected between a top portion of the bags 182, 184, respectively, and the roof or headliner 192 of the vehicle.

The vertical barrier 180 may have an overall shape that is similar to the dimensions of an interior of a vehicle when taken from side-to-side. More particularly, the top portion near the roof may be narrower than a bottom portion near the floor or seats of the vehicle. Thus, the vertical barrier 180 may be adapted such that the first inflatable bag 182 may be adapted to extend near a left side of an interior of the vehicle when the curtain airbag assembly is deployed and the second inflatable bag 184 may be adapted to extend near a right side of the interior of the vehicle when the curtain airbag assembly is deployed.

Figure 13:
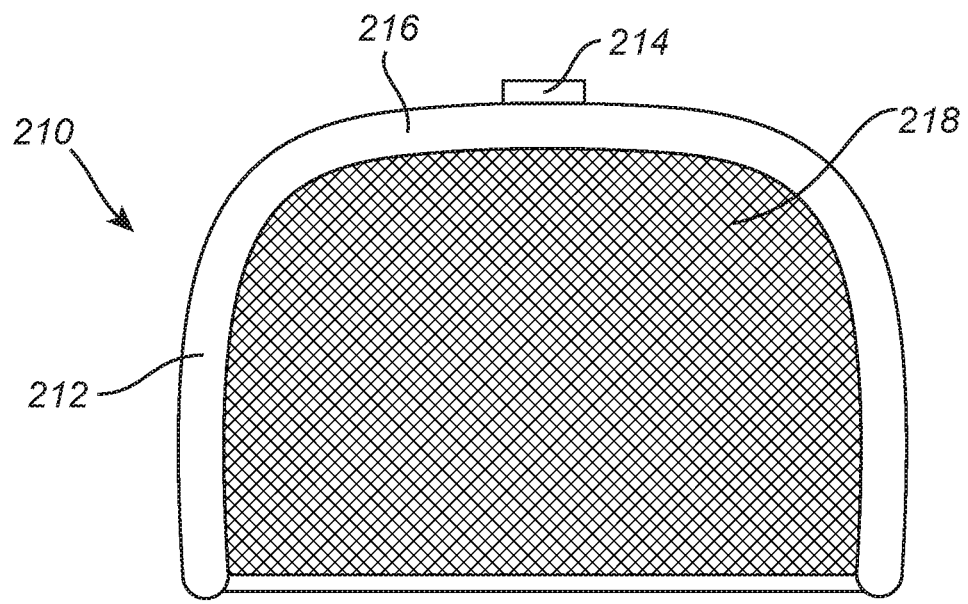
FIG. 13 is a diagram illustrating a rear view of a third implementation of a vertical barrier of one of the curtain airbag assemblies shown in FIGS. 2-8, according to some embodiments.

FIG. 13 shows a rear view of a third embodiment of a vertical barrier 210 of one of the curtain airbag assemblies shown in FIGS. 2-8. In this embodiment, the vertical barrier 210 includes single inflatable bag 212 that can be inflated by a single inflator 214. This embodiment is similar to the embodiment shown in FIGS. 11-12, except that the first and second inflatable bags 182, 184 are pneumatically joined by a horizontal channel 216. The single inflator 214 may be adapted to connect a top portion of the horizontal channel 216 of the vertical barrier 210 to the roof and/or headliner. Other parts of the top portion of the horizontal channel 216 may also be connected to the roof and/or headliner. A screen 218 or mesh may be attached to inner edges of the inflatable bag 212 with a strap 219 connected between the bottom ends of the inflatable bag 212.

Figure 14:
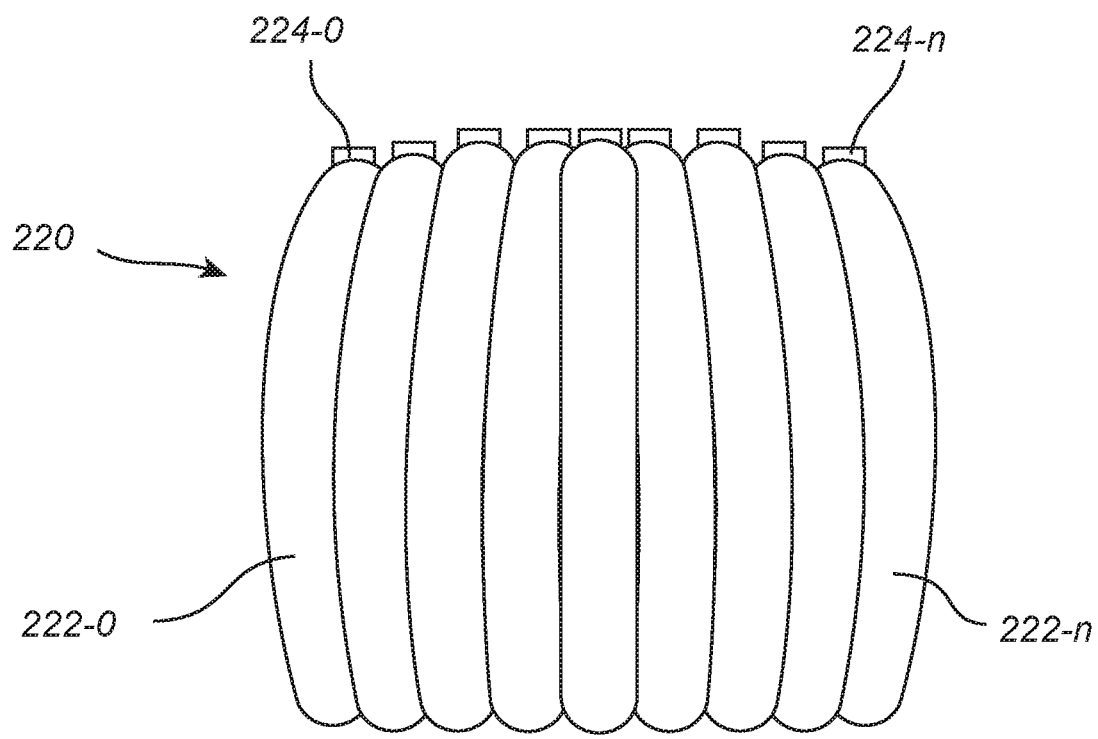
FIG. 14 is a diagram illustrating a rear view of a fourth implementation of a vertical barrier of one of the curtain airbag assemblies shown in FIGS. 2-8, according to some embodiments.

FIG. 14 shows a rear view of a fourth embodiment of a vertical barrier 220 of one of the curtain airbag assemblies shown in FIGS. 2-8. In this embodiment, the vertical barrier 220 includes a plurality of columns $222\text{-}0$ through $222\text{-}n$, formed side-by-side. According to some implementations, the columns $222\text{-}0$ through $222\text{-}n$ may be connected together to form a shield to prevent unrestrained objects from passing these line of columns or gaining ground on the rear-facing passenger space. For example, the vertical barrier 220 may include between five and eleven columns or any other suitable number of columns.

In some embodiments, the vertical barrier 220 may be inflated using any number of inflators. For example, each column $222\text{-}0$ through $222\text{-}n$ may be inflated by a corresponding inflator $224\text{-}0$ through $224\text{-}n$, as shown. In other embodiments, the vertical barrier 220 may include one inflator for inflating some or all of the columns, or may include between one and n inflators for inflating some or all of the columns. Regarding the embodiments in which there are fewer inflators than inflatable columns, the columns may include pneumatically connected portions to allow the gas generated during the initiation of the airbag deployment to pass into each inflatable column for proper inflation.

Thus, with respect to the embodiment shown in FIGS. 11-12, the embodiment of the vertical barrier 220 shown in FIG. 14 may include one or more additional inflatable parts (e.g., columns $222\text{-}1$ through $222\text{-}(n-1)$) between the end columns $222\text{-}0$ and $222\text{-}n$ (or inflatable bags 182, 184). The central columns may be adapted to extend within a central portion of the interior of the vehicle between the first ($222\text{-}0$) and second ($222\text{-}n$) inflatable parts when the curtain airbag assembly is deployed. Thus, the columns or inflatable parts may be connected side-by-side to form the vertical barrier 220 shown in FIG. 14.

Figure 15:
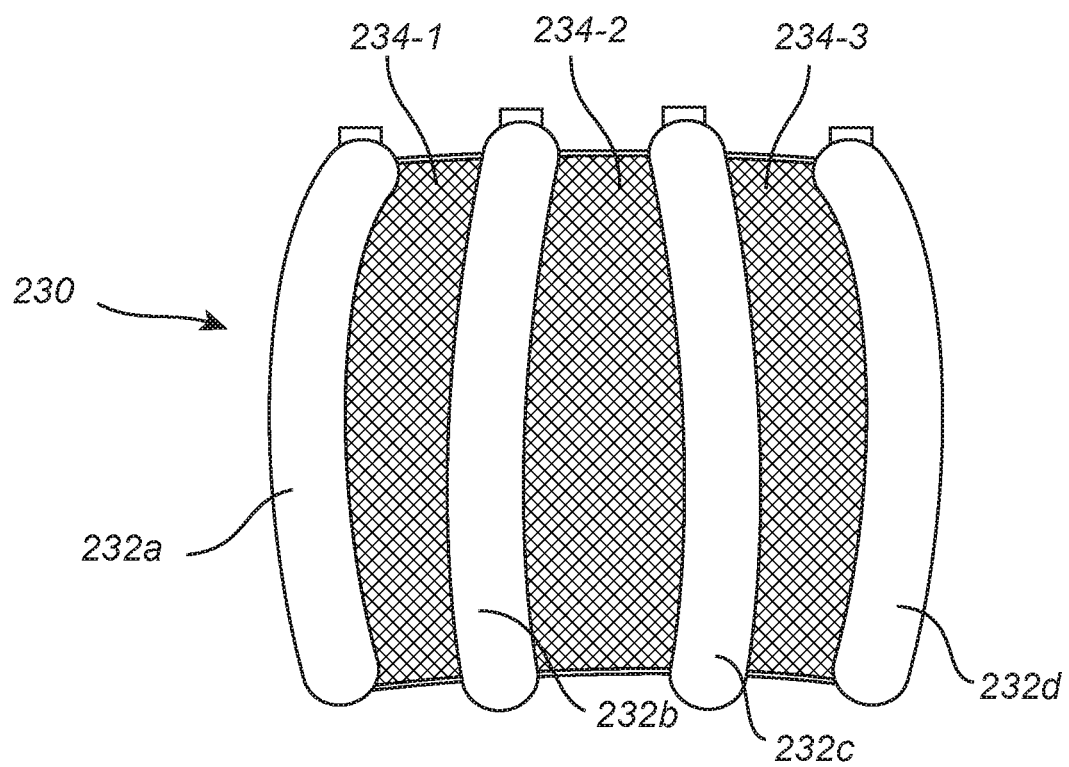
FIG. 15 is a diagram illustrating a rear view of a fifth implementation of a vertical barrier of one of the curtain airbag assemblies shown in FIGS. 2-8, according to some embodiments.

FIG. 15 shows a rear view of a fifth implementation of a vertical barrier 230 of one of the curtain airbag assemblies shown in FIGS. 2-8. In this embodiment, the vertical barrier 230 includes a plurality of column bags 232a, 232b, 232c, 232d. Although four column bags 232 are illustrated, it should be understood that the embodiment of the vertical barrier 230 may include a total of three or more bags, where two bags are positioned on the ends and at least one bag is positioned in the middle between the two outer bags. Thus, this embodiment includes the embodiment of FIGS. 11-12 in addition to at least one extra bag 232 between the inflatable bags 182, 184 on either side.

Also, the vertical barrier 230 may include a plurality of non-inflatable sheets 234-1, 234-2, 234-3, extending between the columns bags 232a, 232b, 232c, 232d. The number of non-inflatable sheets 234 may depend on the number of inflatable parts. In FIG. 15, according to one example, the vertical barrier 230 may include four column bags 232 and three non-inflatable sheets 234. The non-inflatable sheets 234 may be similar to the screen 186 shown in FIGS. 11 and 12 or the screen 218 shown in FIG. 13. In particular, the sheets 234 may include lower straps for connection of the bottom portions of the bags 232 and upper straps for connection of the top portions of the bags 232. Also, the sheets 234 may include any suitable material and may be configured with mesh elements.

Figure 16:
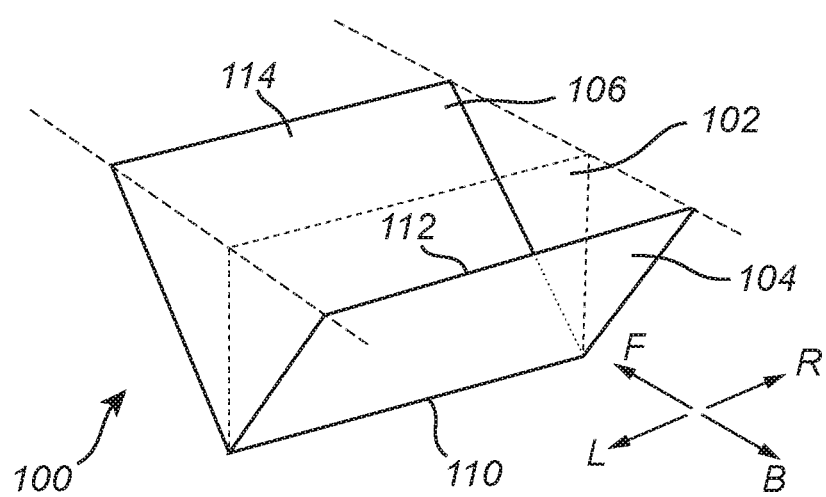
FIG. 16 is a diagram illustrating an isometric view of one of the curtain airbag assemblies of FIGS. 2-8 showing the location of a back angled support apparatus and a front angled support system, according to some embodiments.

FIG. 16 shows a generalized representation of various embodiments of the curtain airbag assemblies, as also shown in FIG. 4, illustrated to demonstrate the general features and locations of the various embodiments of the angled support systems or structures. The vertical barrier is generally indicated by reference numeral 102 and shown by dashed lines. Also, the back angled support system is indicated by reference numeral 104 and the front angled support system is indicated by reference numeral 106 to be consistent with the generalized representation shown in FIG. 4. The back angled support system 104 and front angled support system 106 may be implemented according to any number of various embodiments, such as those described with respect to FIGS. 16-21 discussed below. In some embodiments, the back angled support system 104 and front angled support system 106 may be implemented in a similar manner and include essentially the same elements.

The back angled support system 104 may include any structure that is generally positioned in a plane defined by the bottom portion 110 of the vertical barrier 102 and points along the line or area 112 where one or more top portions of the back angled support system 104 are connected to the roof or headliner of the vehicle. The line or area 112 may also extend, at least partially, from one side of the vehicle to the other. Likewise, the front angled support system 106 may include any structure that is generally positioned in a plane defined by the bottom portion 110 of the vertical barrier 102 and points along the line or area 114 where one or more top portions of the front angled support system 106 are connected to the roof or headliner of the vehicle. Although the back angled support system 104 and front angled support system 106 are illustrated where each is connected to the same bottom portion 110 of the vertical barrier 102, it should be understood that, in some embodiments, the bottom portions of the back and front support systems 104, 106 may be connected to different portions of the vertical barrier 102 at locations at or near the bottom end, such as is shown, for example, in FIGS. 2 and 3.

Figure 17:
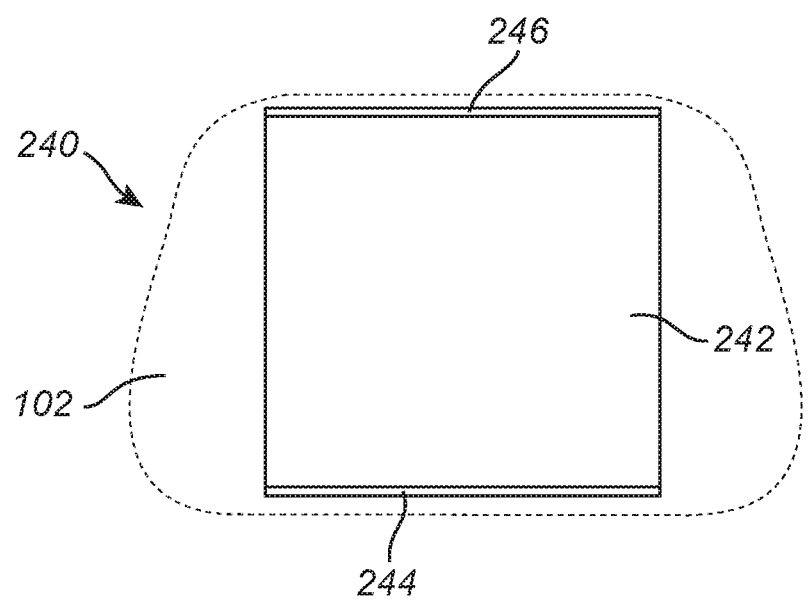
FIG. 17 is a diagram illustrating a rear view of a first implementation of a back angled support system of one of the curtain airbag assemblies of FIGS. 2-8, according to some embodiments.

FIG. 17 shows a rear view of a first embodiment of a back angled support system 240 of one of the curtain airbag assemblies of FIGS. 2-8. This embodiment shown in FIG. 17 may also represent a similar implementation of the front angled support system. In this regard, the following embodiments discussed below with respect to other back angled support systems may also be similarly configured in the front angled support systems as well. In the embodiment of FIG. 17, the back angled support system 240 includes a sheet 242 having a bottom end 244 adapted for connection with a bottom portion of the vertical barrier 102 (indicated in FIG. 17 by dashed lines). A top end 246 of the sheet 242 may be attached to the roof or headliner of the vehicle at a rearward position behind where the vertical barrier 102 is connected to the roof/headliner. The sheet 242 may include any suitable material and may be configured with or without holes therein. According to this embodiment, the sheet 242 may act to block unrestrained object in the event of an accident to supplement the blocking process of the vertical barrier 102.

Figure 18:
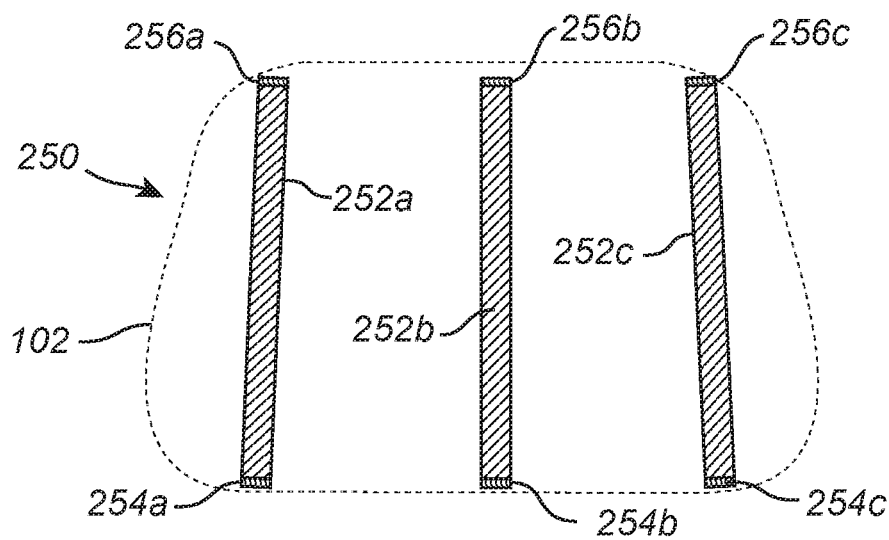
FIG. 18 is a diagram illustrating a rear view of a second implementation of a back angled support system of one of the curtain airbag assemblies of FIGS. 2-8, according to some embodiments.

FIG. 18 shows a rear view of a second implementation of a back angled support system 250 of one of the curtain airbag assemblies of FIGS. 2-8. In this embodiment, the back angled support system 250 may include one or more straps or tethers 252a, 252b, 252c. Bottom ends 254a, 254b, 254c of the tethers 252 may be connected at or near a bottom portion of the vertical barrier 102. Top ends 256a, 256b, 256c of the tethers 252 may be connected to support elements of the roof or headliner. In some embodiments in which the back angled support system 250 includes multiple tethers 252, the outer tethers (e.g., 252a and 252c) may be oriented such that the top ends thereof (e.g., 256a, 256c) may be extended farther outward with respect to the location of their respective bottom ends (e.g., 254a, 254c), such that the fanned out orientation will allow the bottom end of the vertical barrier 102 to be held or contained with a wider base to prevent the bottom corners of the vertical barrier 102 from biasing toward a center position during inflation.

Figure 19:
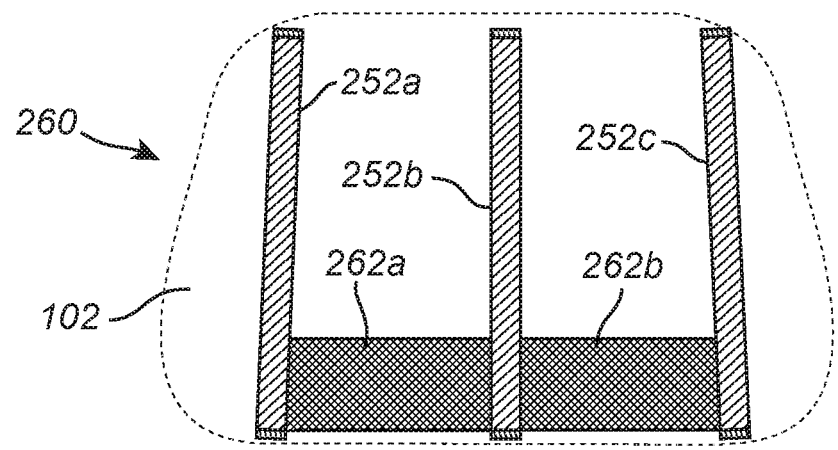
FIG. 19 is a diagram illustrating a rear view of a third implementation of a back angled support system of one of the curtain airbag assemblies of FIGS. 2-8, according to some embodiments.

FIG. 19 shows a rear view of a third implementation of a back angled support system 260 of one of the curtain airbag assemblies of FIGS. 2-8. This embodiment also includes tethers 252, similar to the tethers shown in FIG. 18. However, the back angled support system 260 in the embodiment of FIG. 19 further includes one or more nets 262a, 262b positioned near and connected to a bottom portion of the tethers 252 and/or to a bottom portion of the vertical barrier 102. For example, the back angled support system 260 may include a first net 262a connected between bottom portions of first and second tethers 252a, 252b and a second net 262b connected between bottom portions of second and third tethers 252b, 252c.

The nets 262 may be adapted to catch objects that have been flung through the air and have been blocked by the vertical barrier 102. The catching of these objects may restrain the further movement of these objects throughout the passenger cabin if the vehicle experiences an accident involving a vehicle rolling scenario. Also, the nets 262 may help to protect the items that have been tossed around within the cabin from further damage.

Figure 20:
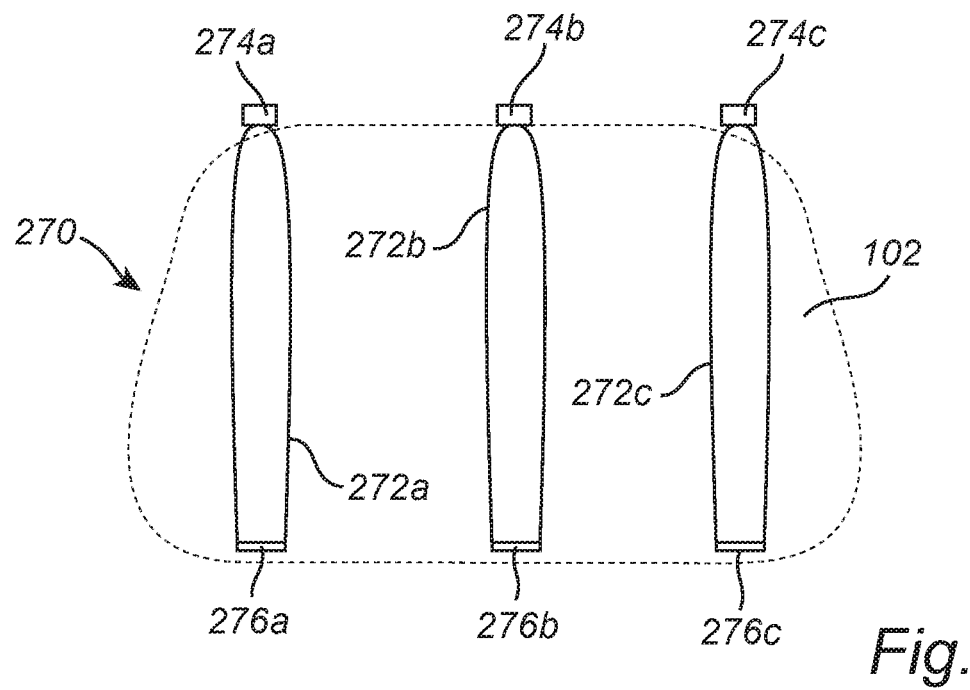
FIG. 20 is a diagram illustrating a rear view of a fourth implementation of a back angled support system of one of the curtain airbag assemblies of FIGS. 2-8, according to some embodiments.

FIG. 20 is a diagram illustrating another embodiment of a back angled support system 270 of one of the curtain airbag assemblies of FIGS. 2-8. In this embodiment, the back angled support system 270 may include one or more airbags, such as column airbags 272a, 272b, 272c. These column airbags 272 may be inflated by one or more inflators 274a, 274b, 274c. Top ends of the airbags 272 may be connected to the roof/headliner via the inflators 274 and bottom ends 276a, 276b, 276c of the airbags 272 may be attached to a bottom portion of the vertical barrier 102.

According to the embodiment of FIG. 20, the vertical barrier 102 may be configured such that it may not necessarily include an inflatable element, but may be stretched out instead by the inflating of the airbags 272 of the back angled support system 270. In a similar manner, the front angled support system may include similar inflatable airbag features to further assist in deploying the curtain airbag assembly into a protection condition where the vertical barrier is stretched out to block objects during an accident with or without inflation elements itself. In still other embodiments, the vertical barrier 102 may include additional inflatable elements (e.g., as described with respect to FIGS. 9-15) in addition to the airbags 272 of the angled supports (e.g., back angled support system 270 and corresponding front angled support).

Figure 21:
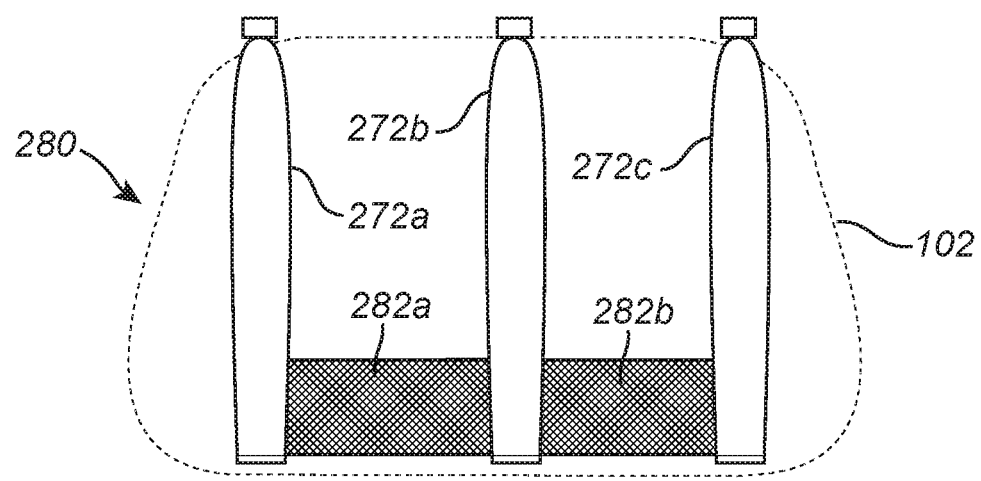
FIG. 21 is a diagram illustrating a rear view of a fifth implementation of a back angled support system of one of the curtain airbag assemblies of FIGS. 2-8, according to some embodiments.

FIG. 21 illustrates a rear view of a fifth implementation of a back angled support system 280 incorporated in one of the curtain airbag assemblies of FIGS. 2-8. The embodiment of FIG. 21 is similar to the embodiment shown in FIG. 20, except that additional nets are provided at bottom portions of the column airbags 272. For example, a first net 282a may be attached between a bottom portion of the first column airbag 272a and a bottom portion of the second column airbag 272b. Also, a second net 282b may be attached between the bottom portion of the second column airbag 272b and a bottom portion of the third column airbag 272c. The nets 282 may also be attached to a bottom portion of the vertical barrier 102. The back angled support system 280 may include two or more column airbags 272 and one or more nets 282 according to various embodiments.

Therefore, according to some embodiments of the present disclosure, a curtain airbag assembly deployable from a headliner section of the vehicle 10 is provided. The curtain airbag assembly may comprise the vertical barrier 102 (e.g., as described with respect to FIGS. 9-15) adapted to extend downward in a substantially vertical direction from the headliner section of the vehicle 10 when the curtain airbag assembly is deployed. The curtain airbag assembly may also comprise a back angled support system (e.g., back angled support system 240 of FIG. 17, back angled support system 270 of FIGS. 20-21, etc.) having a top end connected to a front portion of the headliner section and a bottom end connected to a bottom portion of the vertical barrier 102. Furthermore, the curtain airbag assembly may comprise a front angled support apparatus having a top end connected to a back portion of the headliner section and a bottom end connected to the bottom portion of the vertical barrier. At least one of the back angled support system and front angled support system includes a sheet (e.g., sheet 242 shown in FIG. 17) and/or a plurality of inflatable members (e.g., column airbags 272 shown in FIGS. 20-21).

It should be noted that, as used herein, "vertical" is intended to mean substantially vertical, which may include structures that are disposed at a slight angle relative to absolute vertical.

Although the present invention is illustrated and described herein with reference to preferred embodiments and specific examples thereof, it will be readily apparent to those of ordinary skill in the art that other similar embodiments and examples can perform similar functions and/or achieve like results. All such equivalent or similar embodiments and examples should be considered as being within the spirit and scope of the present invention, are contemplated thereby, and are intended to be covered by the following non-limiting claims.

What is claimed is:

1. An airbag system adapted for use in a vehicle, the airbag system comprising:
   a curtain airbag assembly including at least a vertical barrier adapted to extend in a vertical direction when the curtain airbag assembly is deployed, the vertical barrier having a first inflatable part adapted to extend near a left side of an interior of the vehicle when the curtain airbag assembly is deployed and a second inflatable part adapted to extend near a right side of the interior of the vehicle when the curtain airbag assembly is deployed;
   a back angled support system and a front angled support system both coupled to the vertical barrier and collectively adapted to secure the vertical barrier in a vertical alignment when extended; and
   an inflation module adapted to deploy the curtain airbag assembly in the vertical direction.

2. The airbag system of claim 1, further comprising:
   a plurality of sensors adapted to sense a plurality of parameters associated with operational characteristics of a vehicle; and
   an electronic control unit (ECU) adapted to receive the plurality of parameters from the plurality of sensors, the ECU further adapted to monitor the plurality of parameters to determine if the vehicle is experiencing an accident;
   wherein, if the ECU determines that the vehicle is experiencing an accident, the ECU is further adapted to provide a trigger signal to the inflation module to initiate a process to deploy the curtain airbag assembly.

3. The airbag system of claim 1, wherein the vertical barrier further comprises a non-inflatable sheet extending from the first inflatable part to the second inflatable part.

4. The airbag system of claim 3, wherein the non-inflatable sheet includes mesh elements.

5. The airbag system of claim 3, wherein the non-inflatable sheet includes a net disposed along a lower edge thereof.

6. The airbag system of claim 1, wherein the inflation module includes a first inflator and a second inflator, the first inflator adapted to inflate the first inflatable part and the second inflator adapted to inflate the second inflatable part.

7. The airbag system of claim 1, wherein the inflation module includes a single inflator adapted to inflate both the first inflatable part and the second inflatable part.

8. The airbag system of claim 7, further comprising a horizontal channel adapted to enable gas from the single inflator to inflate both the first inflatable part and the second inflatable part.

9. The airbag system of claim 1, wherein the vertical barrier of the curtain airbag assembly further includes one or more additional inflatable parts adapted to extend within a central portion of the interior of the vehicle between the first and second inflatable parts when the curtain airbag assembly is deployed.

10. The airbag system of claim 9, wherein the first inflatable part, the one of more additional inflatable parts, and the second inflatable part are connected side-by-side to form the vertical barrier.

11. The airbag system of claim 9, further comprising a plurality of non-inflatable sheets extending between the first inflatable part, the one or more additional inflatable parts, and the second inflatable part.

12. The airbag system of claim 1, wherein the curtain airbag assembly is adapted to be stowed in a headliner section of the vehicle and, when deployed, is adapted to direct the vertical barrier downward from the headliner section.

13. The airbag system of claim 12, wherein the curtain airbag assembly further includes a second vertical barrier adapted to extend upward in a vertical direction from a floor panel of the vehicle when the curtain airbag assembly is deployed.

14. The airbag system of claim 12, wherein the back angled support system has a top end connected to a rear portion of the headliner section and a bottom end connected to a bottom portion of the vertical barrier, and the front angled support system has a top end connected to a forward portion of the headliner section and a bottom end connected to the bottom portion of the vertical barrier.

15. The airbag system of claim 14, wherein at least one of the back angled support system and front angled support system includes a plurality of tethers.

16. The airbag system of claim 15, further comprising one or more sheets or nets connected between the tethers.

17. The airbag system of claim 12, wherein, when stowed, the vertical barrier is arranged in one of a folded state and a rolled state.

18. A curtain airbag assembly deployable from a headliner section of a vehicle, the curtain airbag assembly comprising:
a vertical barrier adapted to extend downward in a substantially vertical direction from the headliner section of the vehicle when the curtain airbag assembly is deployed, wherein the vertical barrier comprises:
a back angled support system having a top end connected to a back portion of the headliner section and a bottom end connected to a bottom portion of the vertical barrier; and
a front angled support system having a top end connected to a front portion of the headliner section and a bottom end connected to the bottom portion of the vertical barrier;
wherein the back angled support system and the front angled support system are collectively adapted to secure the vertical barrier in a vertical alignment when extended.

19. The curtain airbag assembly of claim 18, wherein at least one of the back angled support system and front angled support system includes one or more of a strap, a sheet, and one or more inflatable members.

20. The curtain airbag assembly of claim 18, wherein the vertical barrier includes a panel airbag inflatable by one or more inflators.

21. The curtain airbag assembly of claim 18, wherein the vertical barrier is adapted to extend downward from an inflator supported in the headliner section when the curtain airbag assembly is deployed.

22. The curtain airbag assembly of claim 18, wherein the vertical barrier includes a first inflatable part adapted to extend near a left side of an interior of the vehicle when the curtain airbag assembly is deployed and a second inflatable part adapted to extend near a right side of the interior of the vehicle when the curtain airbag assembly is deployed.

23. The curtain airbag assembly of claim 18, further comprising:
a left angled support device having a top end connected to a left portion of the headliner section and a bottom end connected to a bottom left corner of the vertical barrier; and
a right angled support apparatus having a top end connected to a right portion of the headliner section and a bottom end connected to a bottom right corner of the vertical barrier.

* * * * *